United States Patent
Wary

(10) Patent No.: US 6,745,326 B1
(45) Date of Patent: Jun. 1, 2004

(54) AUTHENTICATION PROCESS INCLUDING SETTING UP A SECURE CHANNEL BETWEEN A SUBSCRIBER AND A SERVICE PROVIDER ACCESSIBLE THROUGH A TELECOMMUNICATIONS OPERATOR

(75) Inventor: M. Jean-Philippe Wary, Bourg-la-Reine (FR)

(73) Assignee: Societe Francaise du Radiotelephone, Paris la Defense (FR)

( * ) Notice: Subject to any disclaimer, the term of this patent is extended or adjusted under 35 U.S.C. 154(b) by 0 days.

(21) Appl. No.: 09/489,952

(22) Filed: Jan. 24, 2000

(30) Foreign Application Priority Data

Jan. 22, 1999 (FR) .............................. 99 00901

(51) Int. Cl.[7] .......................... H04L 9/00; H04M 1/66; H04Q 7/20
(52) U.S. Cl. ........................ 713/168; 455/411; 455/433; 380/247; 380/248
(58) Field of Search ................. 709/226; 713/168–175; 455/410, 411, 433; 380/247–249

(56) References Cited

FOREIGN PATENT DOCUMENTS

WO        98/51037        11/1998

OTHER PUBLICATIONS

Walker M, "Security in Mobile and Cordless Telecommunications" Proceedings of the Annual European Conference on Computer Systems a software Engineering (Compeuro), The Hague, May 4–8, 1992, No. CONF. 6, May 4, 1992, pp. 493–496, XP000344244.

Molva R et al. "Authentication of Mobile Users" IEEE Network: The Magazine of Computer Communications, vol. 8, No. 2, Mar., 1, 1994, pp. 26–34, XP000515077.

*Primary Examiner*—Gilberto Barron
*Assistant Examiner*—Minh Dinh
(74) *Attorney, Agent, or Firm*—Kinney & Lange, P.A.

(57) ABSTRACT

Security through data transfers through one or several telecommunications networks is accomplished by providing a data transfer process through a secure channel that enables a subscriber and a service provider to communicate in the secure manner without any action by, or even unknown to, the subscriber's attachment network operator. The process is characterized in that it comprises firstly a process for initial registration of the said subscriber with the service provider through the operator, and secondly a process in which each of the communication sessions between the subscriber and the service provider are executed, the initial registration process consisting of an exchange of authentication data (DeviceID, R1; Login, mdp) online or off line, and the encrypted channel may then be setup at the beginning of each session after mutual authentication involving cryptographic functions, and then calculation of an encryption key Kses without transmission of a secret element on the network(s).

17 Claims, 3 Drawing Sheets

AUTHENTICATION PROCESS INCLUDING SETTING UP A SECURE CHANNEL BETWEEN A SUBSCRIBER AND A SERVICE PROVIDER ACCESSIBLE THROUGH A TELECOMMUNICATIONS OPERATOR

BACKGROUND OF THE INVENTION

The field of this invention is to provide security for data transfers through one or several telecommunications networks.

In this case security means the capacity to authenticate parties that wish to communicate, and then if necessary to setup a secure communication channel between them.

It is particularly but not exclusively, suitable for applications in which a subscriber to a telecommunications network connects through a Mobile Equipment, for example using the GSM (Global System for Mobile communications) telecommunications standard or an equivalent or competitive standard such as DCS 1800 (Digital Cellular at 1800 MHz), PCS 1900 (Personal Communication System at 1900 MHz), DECT (Digital European Cordless Telecommunications) or UTMS (Universal Mobile Telecommunication System).

These communications networks with mobile equipment are managed by "mobile network operators", hereinafter referred to as "operators", that perform all subscription management and communication routing functions, and negotiation of access conditions for their subscribers to service providers (or "services or contents servers") accessible through communications networks.

The process according to the invention is preferably applicable to the case in which the subscriber to the telecommunications network through a mobile terminal would like to connect to a correspondent (typically a service provider) in a secure manner, the service provider being accessible on another telecommunications network interconnected with the subscriber's network.

But the security process according to the invention is advantageously applicable in any other context in which a subscriber who has taken out a subscription to a service accessible through a telecommunications network would like to communicate with a remote third party in a secure manner without transferring secret elements through the network, within a data communication involving either a single network, or two or several interconnected networks, when the transfer from one network to the other involves a protocol change.

Although the invention is originally applicable to communications set up between firstly a closed (GSM type) network to which the subscriber is attached, and an open (Internet type) network; the nature (open or closed) of each of the transmission networks involved is not a restrictive characteristic of the general principle of the invention.

Many content services are usually accessible through an open communications network (typically Internet) that has its own communications protocol. Therefore when a GSM mobile terminal would like to access a service of this type, there is a protocol change at the interface between the GSM network and the access network to the Internet type service provider. The role of telecommunications operators is to perform and manage these mediation and interfacing elements.

At the present time, there are authentication and confidentiality processes specific to each of these two networks. Therefore, known solutions consist of implementing available procedures end to end firstly on one and then on the other network, at the time that each data stream is transmitted. The result is usually a loss of confidentiality at the interface. In particular, the use of secure protocols on each upstream and downstream segment makes it necessary for the operator to be in possession of secret elements, keys and/or cryptographic algorithms required by each authentication and confidentiality process. This responsibility introduces an obligation on the operator to respect confidentiality, which may be undesirable for the service provider, for the subscriber and even for the operator himself.

Another known solution consists of using a third party (usually called a "trusted third part") for management of secrets, but this solution is also complex and therefore inappropriate in some situations in which the cost and management complexity are not justified.

BRIEF SUMMARY OF THE INVENTION

One purpose of the invention is to overcome these various disadvantages in the state of the art.

More precisely, a first objective of the invention is to provide an authentication procedure that may be implemented independently of the successive networks used by a communication. This type of authentication procedure must at least enable the service provider to authenticate the subscriber, and preferably also enable the subscriber to identity the service provider, during each session.

Another purpose of the invention is to provide a process for transferring data through an encrypted channel so that a subscriber and a service provider can communicate in a secure manner without any action, and possibly even unknown to, the operator of the network to which the subscriber is attached.

Another purpose of the invention is to provide a process that enables the operator to define the security system and to guarantee the quality of authentication on the link that he controls, without the need for him to know the contents or the operating elements of the encrypted channel.

Another purpose of the invention is to enable the subscriber and the service provider to share knowledge of an encryption key for messages that they exchange on the network, each key advantageously being different for each communication session, without the encryption key being transmitted on the network at any time.

Another purpose of the invention is to make optimum use of security resources inherent to a GSM network, namely essentially the use of secret element(s) and algorithm(s) that exist (or can be possibly (re)programmed) in the terminals of network subscribers, typically in the Subscriber Identity Module (the SIM card) cooperating with the subscriber's radiotelephone terminal.

Another purpose of the invention is to provide the subscriber with a password and the means of calculating an encryption/decryption key, that are assigned and managed exclusively by the service provider, and therefore which do not need to be known to the operator or a third party.

Another purpose of the invention is to provide a process that provides genuine "compartmentalization" between the various service providers, from the communications security point of view, and any transactions initiated by the subscriber.

These purposes, and other purposes that will subsequently become evident, are achieved according to the invention by means of a process for ensuring the security of a communication between firstly a subscriber to a telecommunications network and secondly a service provider accessible through an operator of the said telecommunications network to which the subscriber is attached, this process being characterized in that it comprises firstly a process for initial registration of the said subscriber to the said service provider through the said operator, and secondly a process in which each of the communication sessions between the subscriber and the service provider takes place.

A subscriber obviously means not only the user, but also and particularly his network equipment. Similarly, the service provider means mainly the computer server connected to the network. However, as will be seen below, some information transfers may take place outside the network (for example by letter or fax, etc.) and therefore involve other entities, particularly persons, for their execution.

According to the invention, the initial registration process comprises:

firstly, the telecommunications operator provides the service provider with an identifier (Device ID) of the subscriber in his attachment network, and an authenticator (R1) of the said subscriber composed of a first numeric value calculated from an identifier (Idx) of the service provider in the operator's network, the said identifier (Device ID) of the subscriber in his attachment network, and a secret element (Sec. Op.) characterizing the subscriber;

secondly, the service provider provides the subscriber with data for identification authentication (Login, mdp) of the subscriber with the said service provider.

Furthermore, according to the invention, the execution process of each of the said sessions comprises authentication of the subscriber by the service provider through the following steps:

a step in which a second numeric value (R2) is calculated from a subscriber identifier (mdp) with the service provider and a diversification data (Date) generated at the subscriber, a step in which a third numeric value (R3) is calculated starting from the said first numeric value (R1), the said second numeric value (R2) and a third data (Login) identifying the subscriber with the service provider, a step in which a first data frame composed of the said third numeric value (R3) and input data, namely data (Login) identifying the subscriber with the service provider, and the said diversification data (Date) generated at the subscriber, is transmitted from the subscriber to the service provider, a step in which the service provider authenticates the subscriber by recalculating, as a validation, the said third numeric value (R3) starting from the said input data (Login, Date) in the said first data frame, and data (R1, mdp) already provided to the service provider and associated with the subscriber.

According to one advantageous characteristic of the invention, the process also comprises authentication of the service provider by the subscriber by means of the following steps:

a step in which a fourth numeric value (R4) is calculated starting from the said subscriber authenticator (R1), a random variable (Random) generated at the service provider and diversification data (Date);

a step in which a second data frame composed of the said fourth numeric value (R4) and the said random variable (Random), is transmitted from the service provider to the subscriber;

a step in which the subscriber authenticates the service provider by a recalculation, as a validation of said fourth numeric value (R4) starting from the said random variable (Random) in the second data frame, and data (R1, Date) provided to the said subscriber.

Thus, provided that he respects all the characteristics mentioned above, the process enables mutual authentication of the supplier and the service provider.

When the authentication has been confirmed, comprises:

a phase in which a session key (Kses) common to the said subscriber and the said service provider is generated; and a phase in which the encrypted data are transmitted by means of the said session key (Kses).

In this case, the said phase in which a session key (Kses) is generated preferably comprises the following steps:

a step in which the service provider calculates a session key (Kses) starting from calculation data comprising the said second numeric value (R2) and a random variable (Random2);

a step in which the single random variable (Random2) is transmitted to the subscriber, except when the said random variables Random and Random2 are identical, in which case the said phase in which a session key (Kses) is generated does not include any data transmission from the service provider to the subscriber, since the random variable was already provided to the subscriber in the second data frame;

a step in which the subscriber calculates the said session key starting from the said calculation data, namely from the said transmitted random variable (Random2) and the said second numeric value (R2) provided to the said subscriber.

In The characteristics of the invention described above, the process comprises the following successive and separate steps in each session:

the service provider authenticates the subscriber;

the subscriber authenticates the service provider; channel.

a session key is calculated to setup an encrypted channel.

All or part of the proposed complete process can thus be implemented selectively.

However in another variant embodiment, the step in which the subscriber authenticates the service provider can be combined with the step in which the session key is calculated to set up the encrypted channel. According to this variant, the said data for calculation of the session key (Kses) also include the subscriber authenticator (R1), the said authenticator (R1) being available both to the service provider and to the subscriber, without the need for the service provider to transmit it to the subscriber. At this time, if the said session key (Kses) is calculated correctly, the service provider is effectively authenticated by the subscriber due to intelligibility of encrypted data received by the service provider and decrypted using the said session key (Kses) calculated by the subscriber.

Therefore there is no longer any need to use calculations and information transfers related to the fourth numeric value R4.

The calculation of the session key, either in the embodiment with separate steps or in the embodiment combining the return authentication and calculation of the key, may itself include a variant by which the said data used to calculate the session key (Kses) also include the diversification data (Date), noting that this diversification data (Date) is provided both to the said service provider and to the subscriber and that it is therefore not necessary to retransmit it from the service provider to the subscriber.

Thus, according to the invention and regardless of the variants, the authentication scheme combines two security layers, namely identification/authentication (DeviceID, R1) at network level, with an identification at application level (Login, mdp). Therefore, the intrinsic security available from a telecommunications network is used in the application, during authentication of the parties and/or when setting up an encrypted communication.

Mutual authentication is based on the operator distributing a value R1 at the time that the subscriber is registered with the service provider, the service provider being responsible for ensuring that this value that he keeps in his authentication database is protected. In principle, the subscriber does not keep this value R1 (for security reasons) but is in a position to automatically recalculate it every time that a new session is initialized. Two exchanges are then necessary for the parties to mutually authenticate each other and setup a secure channel.

Note that setting up an encrypted channel only requires one item of secret information, which is generated under the responsibility of the attachment operator, the secret information being held by the subscriber or confined within his equipment connected to the network.

According to one advantageous characteristic of the invention, the service provider builds up a database associating at least one of the following items of data with each registered subscriber:

an identifier (DeviceId) for the subscriber in his attachment network;

subscriber identification/authentication data with the service provider (Login, mdp);

the numeric value R1 received from the operator at the time of the initial registration process;

possibly, some or all of the values Date, R3, R4, Random, Random2 and Kses specific to the current communication session.

According to another characteristic of the invention, at least some of the said first, second and third (and possibly fourth) numeric values of R1, R2, R3 and R4 and the session key Kses are calculated using a cryptographic algorithm f1, f2, f3, f4, fk. Preferably, the said cryptographic algorithm belongs to the group including:

algorithms with a single-directional chopping function with a key, such as DES in MAC mode;

algorithms with a single-directional chopping function without a key, such as md5 (registered trademark), RIPEM and SHA;

algorithms with bit mixing.

Advantageously, the said first numeric value R1 is calculated using an A3/A8 type algorithm f1.

According to another preferred characteristic of the invention, the said secret element (Sec. Op.) characterizing the subscriber belongs to the group containing the key Ki contained in the SIM card of the subscriber's mobile (in the case of a GSM type network) and an arbitrary key Kkm available in the subscriber's terminal.

Similarly, when the subscriber is attached to the GSM network, the subscriber's identifier (Device ID) in his attachment network advantageously belongs to the group including the IMSI (International Mobile Subscriber Identity) and the MSISDN (Mobile Station ISDN number).

Preferably, the said identification/authentication data (Login, mdp) of the subscriber with the said service provider comprise:

a subscriber identifier (Login) in the service provider's network;

a secret element (mdp) supplied to the subscriber by the service provider.

Advantageously, the said diversification data (Date) used to calculate a second numeric value (R2) belongs to the group comprising the date and/or time of the session, a number incremented in each new session requested by the subscriber, and a random number generated at the subscriber.

Advantageously, the service provider can guarantee the quality of the subscriber's diversification data (Date), by checking that it actually changes with time. For example, he can make this verification by keeping the value (Date) of the last connection attempt, to check if this value is actually different from the current value (Date).

According to a degraded version of the security scheme proposed by the invention, the said first numeric value (R1) is not calculated and is ignored in at least some steps of the process, the said phase in which the service provider authenticates the subscriber then being eliminated. The consequence of this simplification is loss of the mutual authentication process, making the scheme vulnerable to "man in the middle" type attacks (referring to intrusions within the communication). But the other identification and authentication functions remain.

Use of the second numeric value R2 can also be simplified by simply reducing it to the value of the secret element (mdp) supplied by the service provider to the subscriber. In this case, this value is no longer "dynamic" (in other words variable as a function of occurrences) but is fixed. Obviously, the cryptographic function f2 is then not used.

Other characteristics and advantages of the invention will become obvious from reading the following description of an illustrative and non-restrictive embodiment of the invention, and the attached drawings.

DETAILED DESCRIPTION OF THE INVENTION

Figure 1:
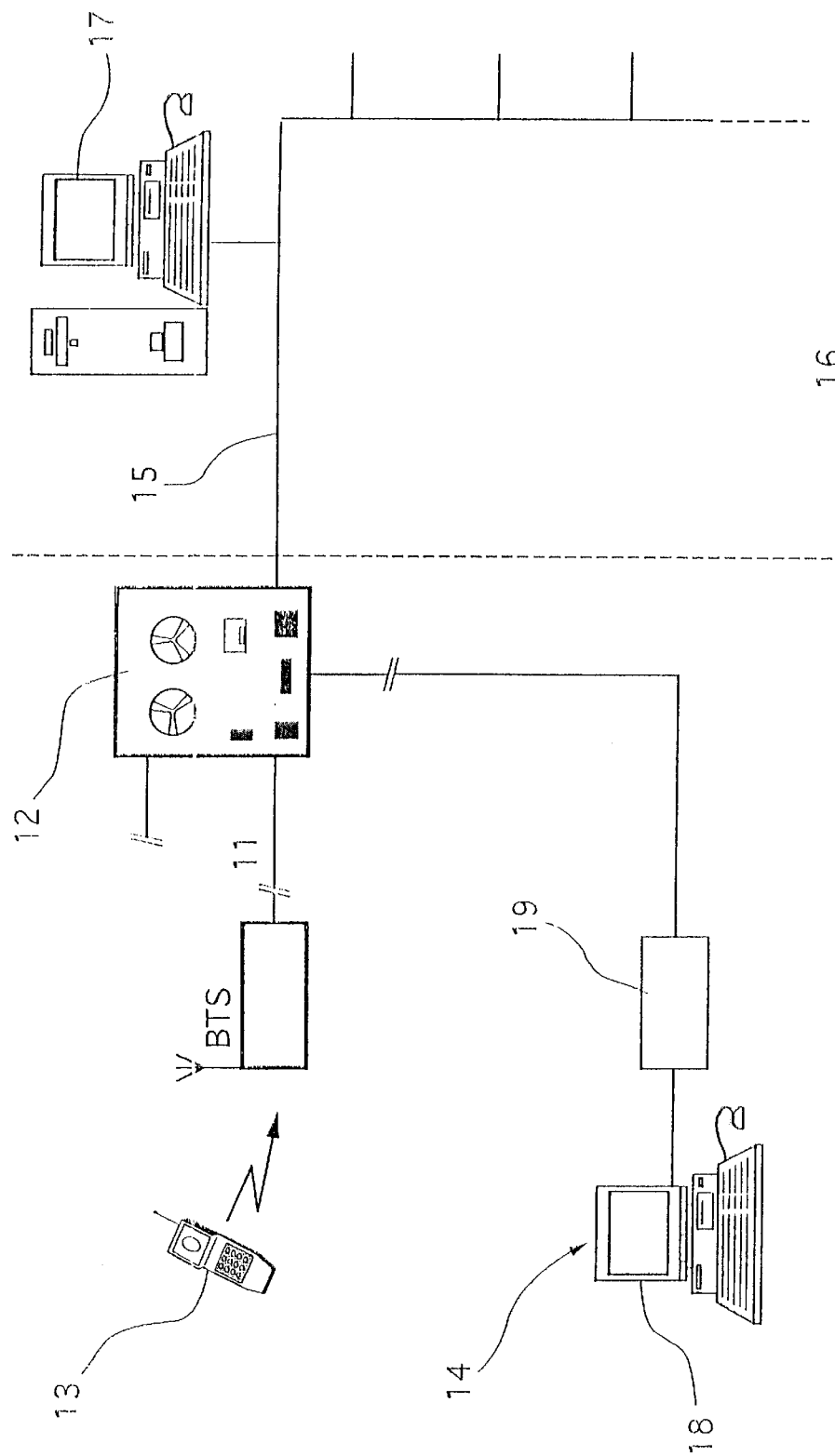
FIG. 1 diagrammatically shows an example configuration of communications network in which the invention may be used.

The configuration in FIG. 1 is made up of a first communications network 11 managed by an operator 12 and comprising a subscriber 13. To illustrate this configuration more precisely, it may be considered that the network 11 is a closed subscription network like a GSM network. The subscriber 13 is provided with a mobile telephone, typically a portable telephone in which a "SIM" card is installed, communicating with the network 11 through a base station (BTS). For example, the same operator 12 may also manage an Intranet, to which a second subscriber 14 is connected. This subscriber 14 communicates through a computer 18 connected to the network through a modem 19.

When requested by a subscriber, the operator 12 is in a position to make an interconnection 15 to a second network 16 that itself comprises a number of users, including an on-line service provider 17.

For example, the network 16 may be an open Internet type network using the IP communication protocol. The on-line service provider 17 is a contents service accessible through a prior process of registration with the service. For example it may be a bank site, made available to its customers by a bank through which they can view their accounts and/or make remote transactions. These operation is are confidential, which requires firstly that the parties concerned (firstly the subscriber customer and secondly the bank) mutually authenticate their identity in order to prevent any fraud, and secondly that information exchanges are encrypted to prevent losses of confidentiality.

Each connection of a customer subscriber to the online service provider initiates a communication session, which is setup and executed according to the secure channel data transfer process according to the invention.

According to the invention, setting up a secure channel requires that the subscriber should be firstly registered with the service provider, and that the operator has transmitted data for subscriber/service provider identification and authentication to the service provider, to be used when setting up communication sessions later on. On the other hand, the secure channel is set up and used without any action by the subscriber's network operator, except obviously to transport the communication itself which remains undecrypted and undecryptable by the operator since the secret elements are only known to the subscriber and the service provider. The operator simply defines the security scheme, in other words enables implementation of the invention. The operator guarantees the quality of the scheme for authentication and confidentiality services. On the other hand, the service provider obviously remains responsible for continuity of the security system at his own level.

Figure 2:
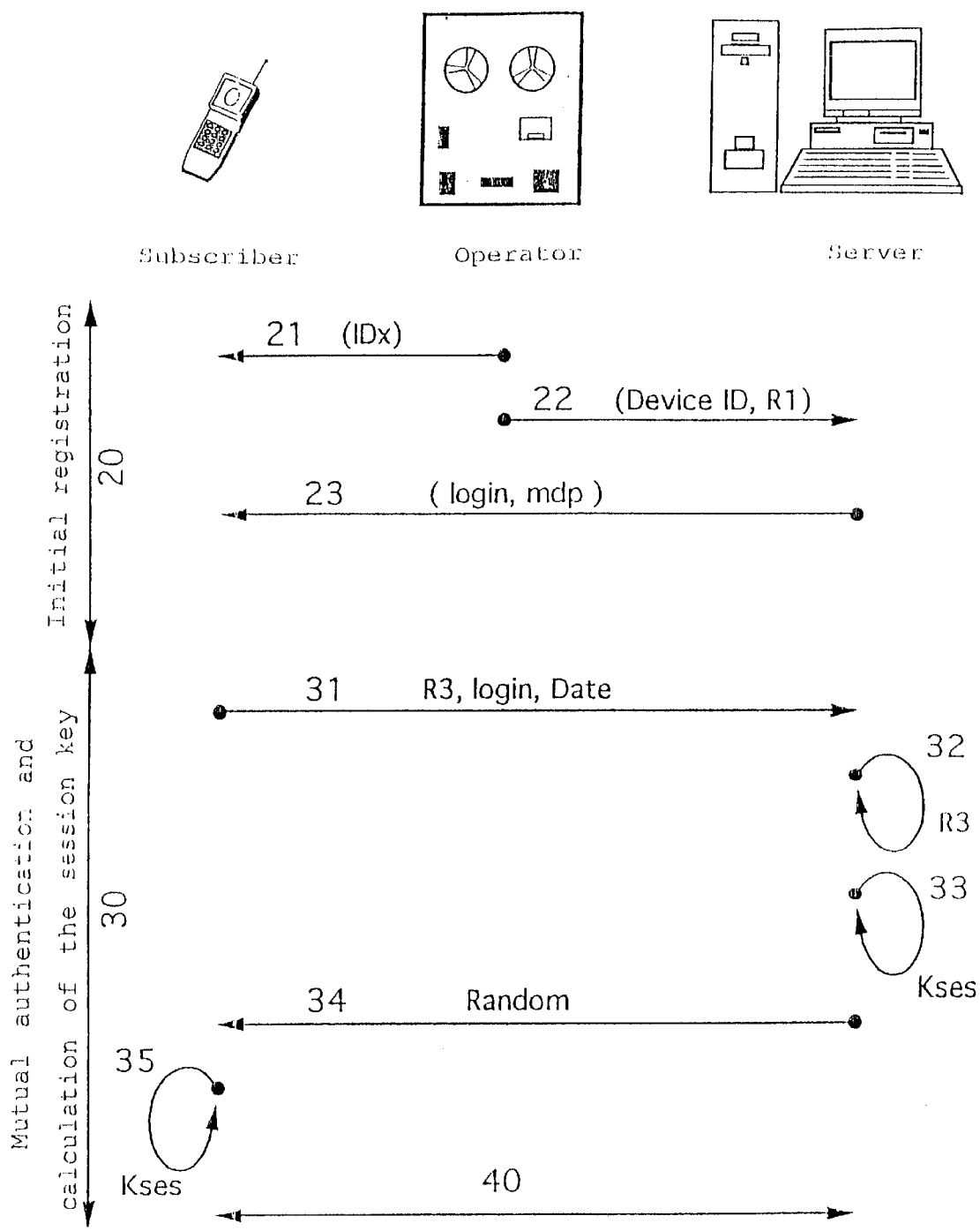
FIG. 2 diagrammatically illustrates the sequence of phases in the variant of the security process according to the invention, in which the return authentication is combined with calculation of the session key.

The diagram shown in FIG. 2 shows the two consecutive processes necessary to implement the process according to the invention, namely:

a first process 20 in which the said subscriber makes his initial subscription to the said service provider through the said operator, a second process 30 in which each of the communication sessions between the subscriber and the service provider takes place.

The following essential data exchanges take place during the first registration (or subscription) process 20.

Firstly, the telecommunications operator will send (21) an identifier (IDx) of the service provider to which the subscriber would like to register, to the subscriber. The identifier IDx is unique for each service provider accessible through the operator's network, according to the security scheme in the invention. For example, when the service provider is accessible on an Internet type network, the IDx identifier may be a URL (Uniform Resource Locator).

Figure 3:
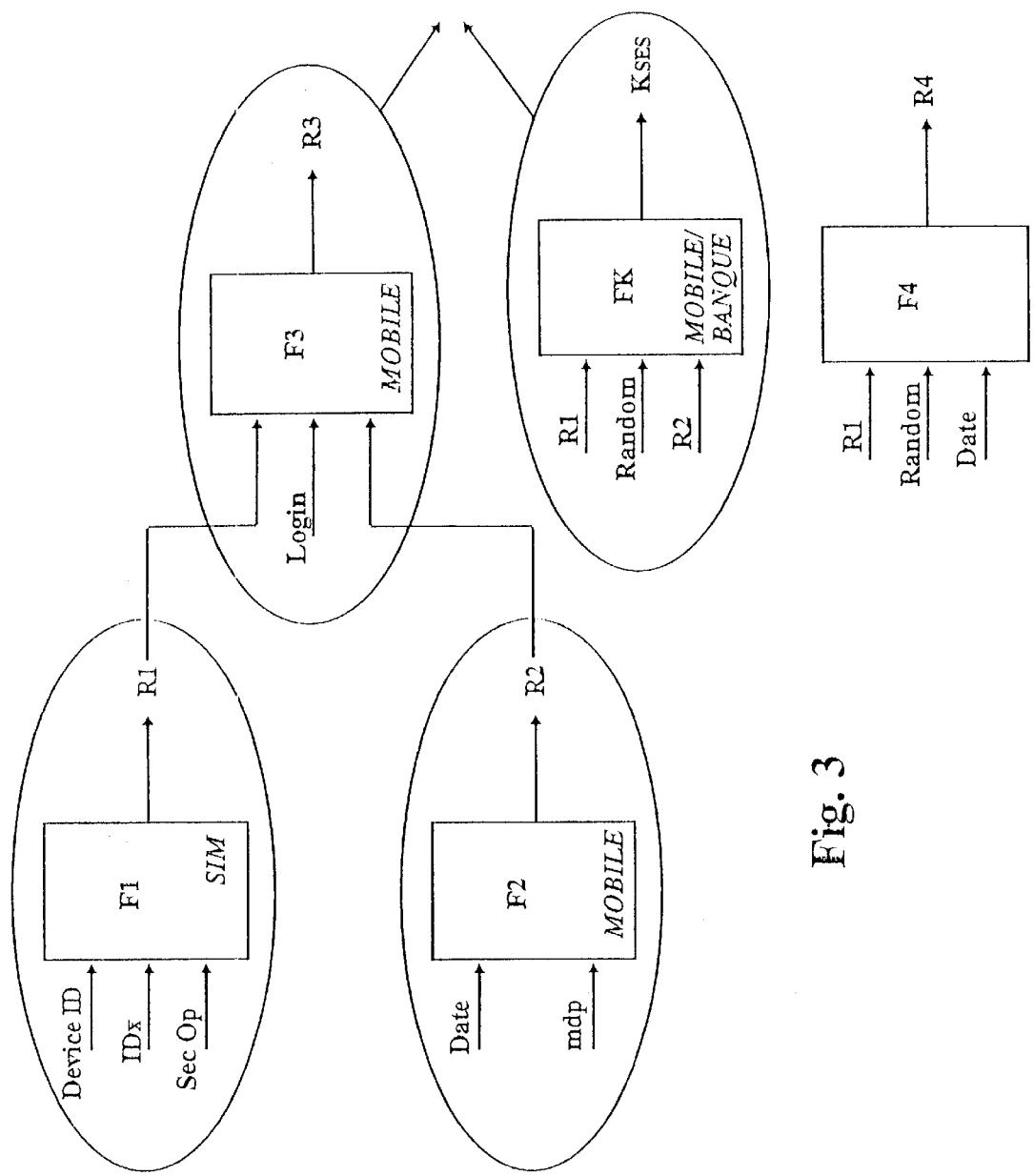
FIG. 3 represents the main steps in the calculation of the numeric values used within the framework of the secure data transfer process according to the invention.

The operator will also route (22) a set of two data items to the service provider considered, namely:

an identifier (Device ID) of the subscriber in his attachment network, and an authenticator (R1) of the said subscriber, which is advantageously calculated under conditions described in detail with relation to the following description of FIG. 3.

The authenticator R1 is calculated starting from a set of values that are unique in the operator's network, and is therefore specific to the link between the specific subscriber and the specific service provider considered, and in this respect should be protected by the service provider. Therefore this value R1 will be different for a given subscriber, depending on the service provider. The authenticator R1 will be stored at all times in the service provider's authentication base.

In return, the service provider will provide (23) two subscriber items of data identifying the subscriber to the said service provider, namely:

a subscriber identifier (Login) in the service provider's network, and a secret element (mdp), for example in the form of a password.

All or some of the data exchanged at this stage may advantageously be carried off-line using procedures specific to each participant (for example by fax, mail or any other means). But in some cases it may be easier to transmit the data on line.

There are several successive distinct phases in the second process 30 in which each of the communication sessions between the subscriber and the service provider are executed.

Firstly, the subscriber will authenticate himself with the service provider by addressing (31) a data frame to him composed of a numeric value (R3) and a set of two input data, namely the data (Login) that frame to him composed of a numeric value (R3) and a set of two input, namely the data (Login) that identifies the subscriber with the service provider, and a diversification data (Date) generated for the subscriber.

This frame is sent immediately after the subscriber has input the pair of values (Login/mdp) identifying him and authenticating him with the service provider, for example using the keypad on his telecommunications terminal. The login value is included directly in the above mentioned frame sent to the service provider, whereas the value mdp is not transmitted but is used in calculating the numeric value R3.

The methods of calculating the numeric value R3 are described in detail with relation to the description of FIG. 3 below.

The diversification data can be any data that guarantees variability and prevents the replay of data supplied by the subscriber during the previous iteration. The objective is obviously to prevent "replay attack" intrusion attempts, in which a third party attempts to substitute himself for the subscriber. The diversification data is advantageously composed of the date and/or time of the session, but may also be any number incremented by the subscriber during each new session, or a random or pseudo-random number generated by the subscriber.

When the service provider receives the frame sent in step 31, he will authenticate (32) the subscriber by recalculating the said third numeric value (R3), for validation, starting from the said input data (Login, Date) for the said data frame, and authentication data (R1, mdp) already known to the service provider and associated with the said subscriber. If the service provider obtains a value identical to the value of R3 received from the subscriber during this validation recalculation, the subscriber is validated and authenticated.

The next step 33 consists of the service provider generating a session key (Kses) starting from a number of data (see below), including one random variable (Random). At this moment, the service provider will limit himself to transmitting (34) the single random variable (Random) to the subscriber, and the subscriber will use this value to recalculate (35) the same session key (Kses) at his end. If this calculation is correct,, the subscriber will be able to authenticate the service provider due to the intelligibility of encrypted data received from the service provider and decrypted using the said session key (Kses) calculated by the subscriber.

The subscriber and the service provider can then communicate (40) in a secure manner on the encrypted channel set up.

This embodiment shown in the figure is only one variant of the invention, namely the variant in which the return authentication (in other words the subscriber's authentication of the service provider) and the calculation of the session key are combined. Those skilled in the art will easily be able to think of other variants starting from this illustrative example.

FIG. 3 shows the main steps in the calculation of numeric values carried out during the initial processes of registering a subscriber, and then the authentication and encryption of communications setup between the subscriber and the service provider.

The first numeric value R1 is calculated using an encryption algorithm f1, for example of the type A3/A8, MD5 or DES, preferably using the following input values:

- the value "IDx" identifying the service provider in the subscriber's attachment network. For example, this identifier is defined by the network operator, who thus references the various service providers accessible by the subscriber, using different values. As already mentioned, each service provider "x" is identified by a different value "IDx".
- the "Device ID" value identifying the subscriber in his attachment network, for example composed of the name of the subscriber or any other subscriber identifier assigned by the operator. The subscriber's identifier (Device ID) may also consist of his IMSI (International Mobile Subscriber Identity) or his MSISDN number (Mobile Station ISDN Number).
- a secret element (Sec Ope) authenticating the subscriber in the operator's network. For example, this secret element could be a password, a PIN code (Personal Identity Code) or a key confined within the network equipment. In the case of a GSM network, the secret element in question is advantageously the Ki key confined in the SIM card. But any other secret element could be accepted as an input value used to calculate R1, for example such as a special key Kkm, dedicated to authentication of GSM subscribers with all contents servers. If the subscriber's terminal is a PC (Personal Computer) or other type of computer, a "hardware" key can also be used.

The value R1 is calculated using the formula R1=f1 (DeviceID, IDx, Sec. Ope). The cryptographic algorithm A3A8 is particularly suitable to the extent that it is already present in the SIM card, in accordance with GSM standards. In this case R1=f1(DeviceID, IDx, Ki), and is advantageously expressed on twelve bytes with f1=A3A8. Therefore, it has the advantage that it minimizes developments, it can be kept secret for third parties, and provides a security level consistent with the attachment network. Any other algorithm already present on the SIM card, for example like the DES algorithm, is also advantageous. Other cryptographic algorithms could also he considered.

The subscriber's equipment, which in the case of a GMS network is the GMS terminal plus its SIM card and an appropriate browser software, is capable of automatically calculating the value R1 when the subscriber chooses to access a specific service provider, obviously after the subscriber has authenticated himself with his network operator.

The second numeric value R2 is calculated using the formula R2=f2 (Date, mdp), in which:

- the algorithm f2 is any appropriate cryptographic algorithm. Preferably, it is an algorithm that calculates a seal using a single directional chopping function. Typically, it may be an algorithm using a key such as DES in MAC mode, or an algorithm without a key like md5 (registered trademark of a compression algorithm marketed by the RSA Inc. company), RIPEM or SHA. These algorithms do not limit the invention.

Thus, an algorithm with mixed bits can also be used, but this would be a cryptographically weak solution.

- the value (Date) is the diversification date discussed above;
- the value mdp is the secret element addressed to the subscriber in step 23 by the service provider, but that the service provider has also kept in his authentication base.

This value R2 is not transmitted as is to the service provider. It is an intermediate variable that is used to calculate the numeric value R3. This value R2 may also be conveniently stored in memory in the subscriber's terminal equipment, provided that it has a memory (for example in a cache memory). Storing the value of R2 in no way modifies the security of the process.

The third numeric value R3 is calculated using the formula R3=f3 (R1, R2, Login) in which:

- the numeric value R1 is the authenticator of the said subscriber calculated as described in detail above and addressed to the service provider during the subscription process;
- the methods of calculating the numeric value R2 were also specified above;
- the login value is the subscriber's identifier in the service provider's network and is retransmitted by the subscriber to the service provider within the data frame routed in step 31 in FIG. 2;
- algorithm f3 is advantageously identical to the algorithm chosen for f2. In any case, it may be chosen from the same possibilities mentioned for f2.

The session key Kses may be expressed in the form Kses=fk(R1, R2, Random) in which:

- the algorithm fk is advantageously identical to the algorithm chosen for f2 and f3. In any case, it may be chosen from the same possibilities mentioned for f2;
- the numeric values R1 and R2 are the same as the values already mentioned;
- the random or pseudo-random value (Random) chosen by the service provider.

In a degraded version of the secure data transfer process, also covered by the invention, the value R1 is neither calculated or used at any stage of the process. The result is that the service provider is no longer authenticated by the subscriber, which makes the communication security more vulnerable to "man in the middle" type intrusions.

What is claimed is:

1. Process for ensuring the security of a communications between firstly a subscriber to a telecommunications network and secondly a service provider accessible through an operator of the telecommunications network to which the subscriber is attached, characterized in that it comprises firstly a process for initial registration of the subscriber to the service provider through the operator, and secondly a process in which each of the communication sessions between the subscriber and the service provider takes place, and in that the initial registration process comprises:

firstly, the telecommunications operator provides the service provider with an identifier (Device ID) of the subscriber in his attachment network, and an authenticator (R1) of the subscriber composed of a first numeric value calculated from an identifier (Idx) of the service provider in the operator's network, the identifier (Device ID) of the subscriber in his attachment network, and a secret element (Sec. Op.) characterizing the subscriber;

secondly, the service provider provides the subscriber with data for identification/authentication (Login, mdp) of the subscriber with the service provider;

and in that the execution process of each of the sessions comprises authentication of the subscriber by the service provider through the following steps:

a step in which a second numeric value (R2) is calculated from a subscriber identifier (mdp) with the service provider and a diversification data (Date) generated at the subscriber a step in which a third numeric value (R3) is calculated starting from the first numeric value (R1), the second numeric value (R2) and a third data (Login) identifying the subscriber with the service provider, a step in which a first data frame composed of the third numeric value (R3) and input data, namely data (Login) identifying the subscriber with the service provider, and the diversification data (Date) generated at the subscriber, is transmitted from the subscriber to the service provider, a step in which the service provider authenticates the subscriber by recalculating, as a validation, the third numeric value (R3) starting from the input data (Login, Date) in the first data frame, and data (R1, mdp) already provided to the service provider and associated with the subscriber.

2. Process according to claim 1, characterized in that it also comprises authentication of the service provider by the subscriber by means of the following steps:

a step in which a fourth numeric value (R4) is calculated starting from the subscriber authenticator (R1), a random variable (Random) generated at the service provider and diversification data (Date);

a step in which a second data frame composed of the fourth numeric value (R4) and the random variable (Random), is transmitted from the service provider to the subscriber;

a step in which the subscriber authenticates the service provider by a recalculation, as a validation of the fourth numeric value (R4) starting from the random variable (Random) in the second data frame, and data (R1, Date) provided to the subscriber.

3. Process according to claim 1, characterized in that it also comprises:

a phase in which a session key (Kses) common to the subscriber and the service provider is generated; and, a phase in which the encrypted data are transmitted by means of the session key (Kses); and in that the phase in which a session key (Kses) is generated preferably comprises the following steps:

a step in which the service provider calculates a session key (Kses) starting from calculation data comprising the second numeric value (R2) and a random variable (Random2);

a step in which the single random variable (Random2) is transmitted to the subscriber;

a step in which the subscriber calculates the session key starting from the calculation data, namely from the transmitted random variable (Random2) and the second numeric value (R2) provided to the subscriber.

4. Process according to claim 2, characterized in that the random variables Random and Random2 are identical, and in that the phase for creation of a session key (Kses) does not comprise any data transmission from the service provider to the subscriber, and random variable already being available to the subscriber by means of the second data frame.

5. Process according to claim 3, characterized in that the calculation data for the session key (Kses) also include the authenticator of the subscriber (R1), the authenticator (R1) being provided both to the service provider and to the subscriber without the need for it to be transmitted from the service provider to the subscriber, and in that if the calculated session key (Kses) is obtained correctly, the service provider is effectively authenticated by the subscriber due to the fact that the encrypted data received from the service provider and decrypted by means of the session key (Kses) calculated by the subscriber are intelligible.

6. Process according to claim 1, characterized in that the calculation data for the session key (Kses) also include the diversification data (Date), the diversification data (Date) being provided both to the service provider and the subscriber without the need for it to be transmitted from the service provider to the subscriber.

7. Process according to claim 1, characterized in that the service provider builds up a database associating the following items of data with each registered subscriber:

an identifier (DeviceID) for the subscriber in his attachment network;

subscriber identification/authentication data with the service provider (Login,mdp);

the numeric value R1 received from the operator at the time of the initial registration process;

possibly, some of all of the values Date, R3, Random, Random2 and Kses specific to the current communication session.

8. Process according to claim 1, characterized in that at least some of the first, second, third and fourth numeric values of R1, R2, R3 and R4 are the session key Kses are calculated using a cryptographic algorithm f1, f2, f3, f4, fk.

9. Process according to claim 8, characterized in that the first numeric value R1 is calculated using an A3/A8 type algorithm f1.

10. Process according to claim 8, characterized in that the cryptographic algorithm belongs to the group containing:

algorithms with a single-directional chopping function with a key, such as DES in MAC mode;

algorithms with a single-directional chopping function without a key, such as md5 (registered trademark), RIPEM and SHA;

algorithms with bit mixing.

11. Process according to claim 1, characterized in that the secret element (Sec. Op.) characterizing the subscriber belongs to the group containing the key Ki contained in the SIM card of the subscriber's mobile and an arbitrary key Kkm available in the subscriber's terminal.

12. Process according to claim 1, characterized in that when the subscriber is attached to the GSM network, the subscriber's identifier (Device ID) in his attachment network advantageously belongs to the group including the IMSI (International Mobile Subscriber Identity) and the MSISDN (Mobile Station ISDN number).

13. Process according to claim 1, characterized in that the identification/authentication data (Login, mdp) of the subscriber with the service provider comprise:

a subscriber identifier (Login) in the service provider's network;

a secret element (mdp) supplied to the subscriber by the service provider.

14. Process according to claim 1, characterized in that the diversification data (Date) used to calculate a second numeric value (R2) belongs to the group comprising the date and/or time of the session, a number incremented in each new session requested by the subscriber, and a random number generated at the subscriber.

15. Process according to claim 1, characterized in that the first numeric value (R1) forming the authenticator of the subscriber is generated during each session and is not kept by the subscriber.

16. Process according to claim 1, characterized in that at least some of the data (Device ID, R1; Login, mdp) exchanged during the initial registration phase of the subscriber with the service provider are transmitted using a means comprising online transmissions and off line transmissions.

17. Process according to claim 1, characterized in that the second numeric value (R2) is simply equal to the secret element (mdp) supplied by the service provider to the subscriber.

* * * * *

UNITED STATES PATENT AND TRADEMARK OFFICE
CERTIFICATE OF CORRECTION

PATENT NO.     : 6,745,326 B1
DATED          : June 1, 2004
INVENTOR(S)    : M. Jean-Philippe Wary It is certified that error appears in the above-identified patent and that said Letters Patent is hereby corrected as shown below:

Title page,
Item [56], References Cited, U.S. PATENT DOCUMENTS, insert the following cited references,
-- 6,148,405 11-2000   Liao et al.
   6,169,890 01-2001   Vatanen, Harri Tapani
   6,230,002 05-2001   Floden et al.
   6,363,151 03-2002   Linder, Hermann
   6,411,807 06-2002   Amin et al. --
Item [57], ABSTRACT,
Line 8, delete "the said subscriber", insert -- the subscriber --

Column 1,
Line 24, delete "UTMS", insert -- UMTS --

Column 2,
Line 28, delete "identity", insert -- identify --

Column 4,
Line 9, after "confirmed," insert -- preferably mutually, the process also advantageously --
Line 33, delete "The", insert -- the --
Line 37, delete "channel."

Column 5,
Line 28, delete "(DeviceId)", insert -- (DeviceID) --

Column 6,
Line 39, delete "network", insert -- networks --

Column 7,
Line 5, delete "operation is are", insert -- operations are --

Column 8,
Line 20, delete "frame to him composed of a numeric value (R3) and a set of two input, namely the date (Login) that"
Line 62, delete "correct,,", insert -- correct, --

UNITED STATES PATENT AND TRADEMARK OFFICE
CERTIFICATE OF CORRECTION

PATENT NO. : 6,745,326 B1
DATED : June 1, 2004
INVENTOR(S) : M. Jean-Philippe Wary It is certified that error appears in the above-identified patent and that said Letters Patent is hereby corrected as shown below:

Column 9,
Line 14, delete "A3/A8", insert -- A3A8 --
Line 30, delete "(Sec Ope)", insert -- (Sec. Op.) --
Line 44, delete "Sec. Ope.", insert -- Sec. Op. --
Line 56, delete "GMS", insert -- GSM --
Line 57, delete "GMS", insert -- GSM --

Signed and Sealed this

Eighth Day of February, 2005

JON W. DUDAS
*Director of the United States Patent and Trademark Office*